United States Patent [19]

Mueller

[11] Patent Number: 4,521,264
[45] Date of Patent: Jun. 4, 1985

[54] METHOD AND APPARATUS FOR INTERNALLY CUTTING A TUBE OF MATERIAL

[75] Inventor: Martin Mueller, Wonder Lake, Ill.

[73] Assignee: Osgood Industries, Inc., Northbrook, Ill.

[21] Appl. No.: 498,981

[22] Filed: May 27, 1983

Related U.S. Application Data

[63] Continuation-in-part of Ser. No. 451,401, Dec. 20, 1982.

[51] Int. Cl.³ .............................................. B23D 21/14
[52] U.S. Cl. ......................................... 156/184; 83/54;
 83/178; 83/180; 83/184; 156/250; 156/443;
 156/446; 156/510; 493/288; 493/289; 493/290
[58] Field of Search ....................... 493/288, 289, 290;
 156/184, 189, 193, 446, 450, 250, 443, 510;
 83/54, 178, 180, 184, 194

[56] References Cited

U.S. PATENT DOCUMENTS 1,519,754 12/1924 Butler ..................................... 83/180
3,270,603 9/1966 Hawkins et al. ....................... 83/184

FOREIGN PATENT DOCUMENTS 918923 2/1963 United Kingdom ................... 83/184

Primary Examiner—Caleb Weston
Attorney, Agent, or Firm—Dressler, Goldsmith, Shore, Sutker & Milnamow, Ltd.

[57] ABSTRACT

A method and apparatus are disclosed for formation of tubular segments from a generally continuous tube of material by internally cutting the tube of material. The apparatus of the present invention includes a forming mandrel upon which the tube of material to be cut is carried, and upon which the tube is preferably spirally wound. The apparatus further includes a rotary cutter assembly mounted within the forming mandrel. The cutter assembly includes a cutter arbor and a blade actuating rod, with one or more cutting blades of the cutter assembly operatively associated with the actuating rod and the arbor such that relative axial movement of the actuating rod and the cutter arbor moves the cutting blades inwardly and outwardly of the forming mandrel of the apparatus. A cam mechanism is provided for effecting this desired relative axial movement. Significantly, the present apparatus facilitates very high speed formation of tubular segments by axially moving the cutting blades of the cutter assembly in the direction of advancement of the tube of material along the forming mandrel during internal cutting of the tube by the cutting blades.

20 Claims, 5 Drawing Figures

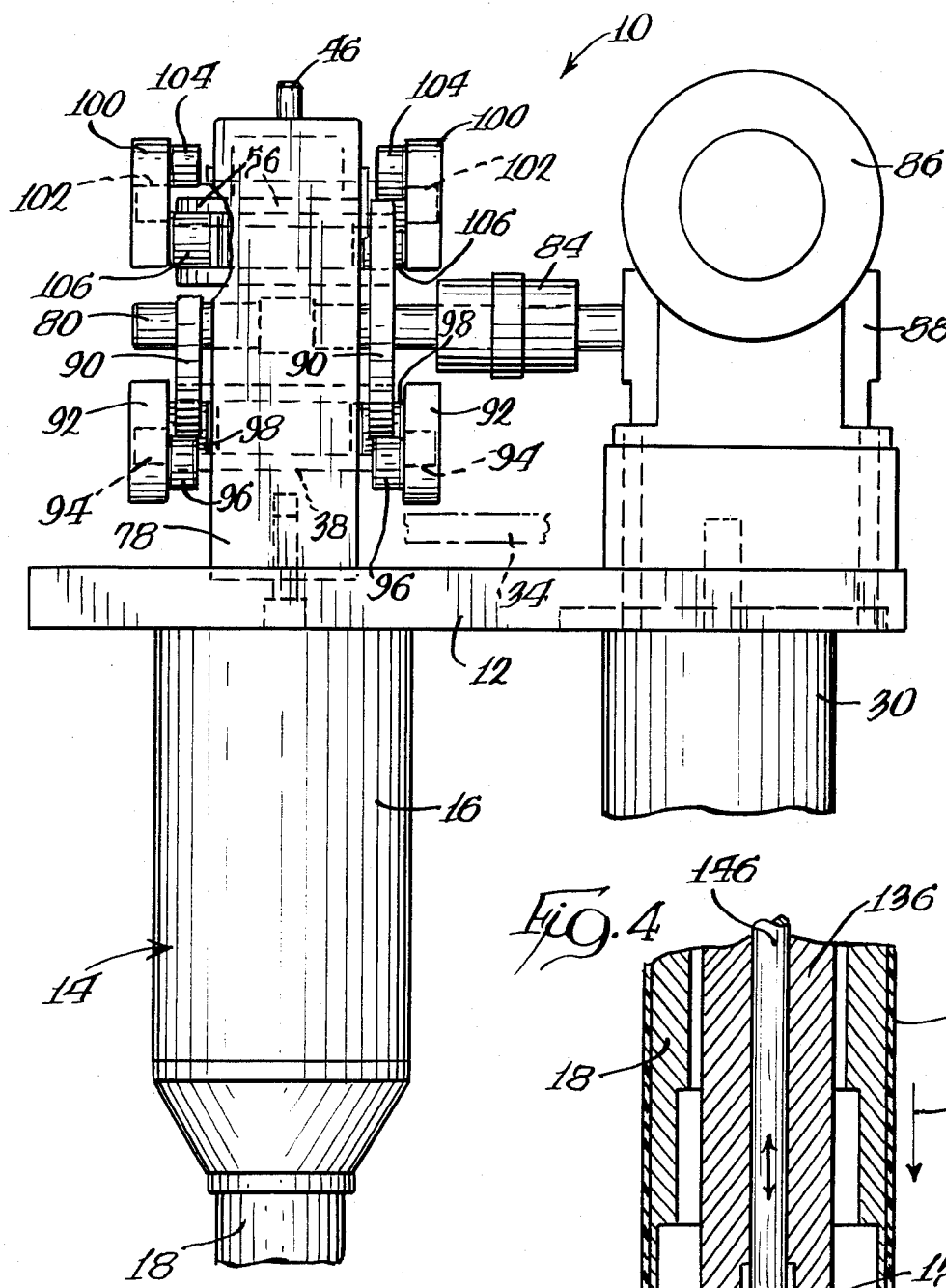

METHOD AND APPARATUS FOR INTERNALLY CUTTING A TUBE OF MATERIAL

CROSS-REFERENCE TO RELATED APPLICATION

The present application is a continuation-in-part of co-pending U.S. application Ser. No. 451,401, filed Dec. 20, 1982.

TECHNICAL FIELD

The present invention relates generally to arrangements for forming tubular segments from a tube of material, and more particularly to a method and apparatus for forming tubular segments by internally cutting a tube of material.

BACKGROUND OF THE INVENTION

Parent U.S. application Ser. No. 451,401, filed Dec. 20, 1982, discloses a method and apparatus for forming spirally wound, heat-shrinkable tamper bands. These tamper bands may be formed as generallly cylindrical tubular segments which are cut from a spirally wound tube of heat-shrinkable material. The tamper bands are preferably formed from expanded polystyrene since its brittle nature readily indicates opening or like tampering of an associated container when the band is heat-shrunk into close fitting association with the container and its closure. The tamper bands can also be formed from other heat-shrinkable expanded thermoplastic materials, such as polypropylene, polyethylene, or polyvinyl chloride. Portions of the above copending application not inconsistent with the present disclosure are herein incorporated by reference.

As will be recognized, efficient and inexpensive manufacture of tamper bands and like tamper-evident seals is highly desirable so that their cost does not add significantly to the cost of products with which they are used. In this regard, fabrication of tamper bands from spirally wound material has proven to be a highly cost-effective improvement upon previous techniques employed for fabricating heat-shrinkable tamper bands. In order to further promote efficient and inexpensive manufacture of tamper bands, it is desirable to provide an arrangement whereby the individual heat-shrinkable tube segments can be quickly and accurately cut from the spirally wound tube of heat-shrinkable material which is formed during their manufacture. The present invention relates to a method and apparatus for cutting individual tube segments in a highly efficient matter, preferably in conjunction with formation of a spirally wound tube of material. While past arrangements for cutting tubular material have typically operated to cut the material from its outer surface, the present invention uniquely functions to internally cut the tube of material into segments.

SUMMARY OF THE INVENTION

The present method and apparatus permit highly efficient formation of tubular segments from a tube of material by internally cutting the tube of material, preferably in conjunction with formation of the tube of material by spirally winding a generally continuous strip of the material. The apparatus disclosed is desirably relatively compact, and is particularly adapted to be integrated with an apparatus for forming a spirally wound tube of material, thus facilitating cutting of the tube into segments of any desired length as the tube is formed. When practiced in accordance with the present disclosure, the invention facilitates very high speed formation of individual tube segments, thus promoting their economical manufacture. When the present invention is used for formation of heat-shrinkable tamper bands in accordance with the above-referenced copending patent application, the resultant bands can be very inexpensively manufactured, yet are highly effective for visually indicating opening of associated containers to which the bands are affixed.

The apparatus of the present invention includes a frame which supports a generally cylindrical forming mandrel upon which the tube of material to be cut is carried, with the tube being adapted to be relatively advanced along the mandrel toward a free end thereof. In the preferred embodiment of the invention, the mandrel provides the structure upon which the tube of material may be continuously spirally wound, with formation of the tube in this manner acting to advance the tube along the mandrel of the apparatus in the desired fashion.

The apparatus of the present invention further includes a rotary cutter assembly rotatably mounted in the forming mandrel for rotation about an axis coinciding with the centerline or longitudinal axis of the mandrel. A cutter drive arrangement is provided for continuously rotating the cutter assembly within the mandrel, with the cutter assembly including one or more cutting blades which are adapted to reciprocably move outwardly and inwardly of the mandrel at the free end thereof. By this arrangement, the one or more cutting blades act to intermittently internally cut and sever the tube of material when the blades are moved outwardly of the mandrel, and thus form tubular segments from the continuous tube of material.

An important feature of the present invention is its adaptability for very high speed formation of tubular segments. To this end, the apparatus of the present invention is uniquely configured to operate such that the cutting blades of the cutter assembly move axially of the forming mandrel in the direction of advancement of the tube of material on the mandrel during cutting of the tube. By operation in this manner, each cut formed in the tube of material is circular and extends in a plane which is substantially perpendicular to the axis of the tube of material. The result is formation of tube segments which are substantially cylindrical. When the present invention is used for formation of heat-shrinkable tube segments, their substantially cylindrical configuration facilitates subsequent heat-shrink fitment to associated containers.

In order to operate in the above preferred manner, the cutter assembly of the present apparatus includes a cutter arbor which extends concentrically within the forming mandrel, and a blade actuating rod which extends concentrically within the cutter arbor. The cutter drive of the apparatus is adapted to rotatably drive the cutter arbor and the blade actuating rod together within the forming mandrel of the apparatus. While the blade actuating rod and cutter arbor are adapted to be rotatably driven together, the arbor and actuating rod are adapted for relative axial movement with respect to each other, as well as with respect to the forming mandrel.

The one or more cutting blades of the apparatus are operatively connected with the blade actuating rod of the cutter assembly so that reciprocable, relative axial movement between the cutter arbor and the actuating rod acts to reciprocably move the cutting portion(s) of the one or more cutting blades inwardly and outwardly of the forming mandrel at its free end. This relative axial movement is effected by means of a cam mechanism which operates to axially move the cutter arbor and blade actuating rod with respect to each other, as well as with respect to the forming mandrel. An arrangement of flanged couplings and cam links operatively interconnects a timing cam arrangement with the blade actuating rod and the cutter arbor to permit their axial movement as they rotate within the forming mandrel.

In the preferred mode of operation, the cam mechanism operates to first relatively axially move the cutter arbor and blade actuating rod to move the one or more cutting blades of the cutter assembly outwardly of the forming mandrel. The cam mechanism further operates to axially move the actuating rod and cutter arbor together within the forming mandrel in the direction of tube advancement so that the cutting blades of the apparatus move in the direction of tube advancement during internal cutting of the tube.

Numerous other advantages and features of the present invention will become readily apparent from the following detailed description, the accompanying drawings, and the appended claims.

BRIEF DESCRIPTION OF THE DRAWINGS

FIG. 1A is an enlarged, fragmentary view of the portion of the apparatus illustrated in FIG. 1 at which internal cutting of the associated tube of material is effected;

FIG. 3 is a partial side elevational view in partial cutaway of the apparatus illustrated in FIG. 1 taken generally along lines 3—3 of FIG. 2; and FIG. 4 is a view similar to FIG. 1A illustrating an alternate construction for a portion of the cutter assembly of the present apparatus.

DETAILED DESCRIPTION

Figure 1:
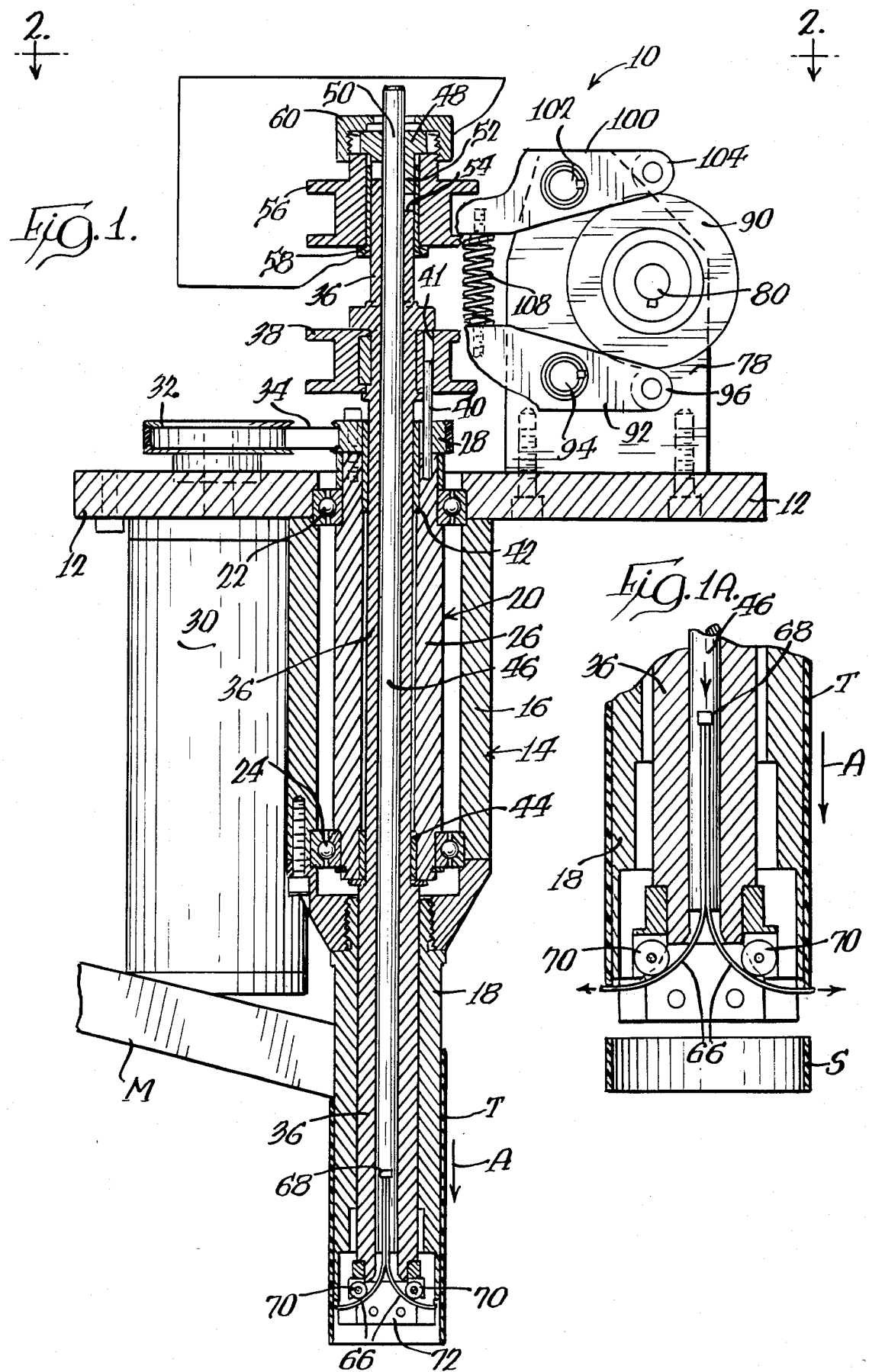
FIG. 1 is a side elevational view in partial cross-section and cutaway illustrating an apparatus for internally cutting a tube into segments embodying the principles of the present invention.

While the present invention is susceptible of embodiment in various forms, there is illustrated in the drawings and will be hereinafter described presently preferred and alternate embodiments of the present invention, with the understanding that the present disclosure is to be considered as an exemplification of the invention, and is not intended to limit the invention to the specific embodiments illustrated.

Referring now to FIG. 1, therein is illustrated a tube cutting apparatus 10 embodying the principles of the present invention. While the apparatus 10 is illustrated in a general vertical orientation, it will be recognized that the apparatus can be readily otherwise positioned for operation. Accordingly, terms such as upper and lower used in this disclosure will be understood as referring to the apparatus in its illustrated orientation, and will be further understood as not suggesting that the present apparatus cannot be oriented other than generally vertically.

Apparatus 10 includes a frame 12 from which depends a mandrel assembly, generally designated 14. The mandrel assembly includes an upper mandrel portion 16 affixed to frame 12, and a lower, cylindrical forming mandrel 18 which depends from the upper portion 16. The forming mandrel 18 is adapted to carry a tube of material to be cut into tubular segments. Thus, the forming mandrel 18 is preferably sized for the desired diameter of the tubular segments to be formed.

In the preferred embodiment of the invention, the tube of material to be cut, designated T, is formed on forming mandrel 18 by spiral winding. Accordingly, FIG. 1 diagramatically illustrates a strip of material M being wound on forming mandrel 18 to form tube T. As disclosed in copending application Ser. No. 451,401, a driven winding belt (not shown) is preferably provided for spirally winding the tube T from the strip of material M. Attendant to tube formation in this manner, the formed tube of material rotates about the forming mandrel 18, with the tube of material being relatively advanced toward the free end of the forming mandrel 18, as indicated by arrow A. It will be noted that the forming mandrel 18 is preferably threadably or otherwise releasably connected with the upper mandrel portion 16, thus facilitating replacement of the forming mandrel 18 with differently sized mandrels for forming tube T of the desired diameter.

In order to effect internal cutting of tube T for forming tube segments, one such segment being shown in FIG. 1A and designated S, a rotary cutter assembly 20 is provided within the mandrel assembly 14. The cutter assembly 20 is preferably arranged concentrically within the mandrel assembly 14, and is rotatably supported therein by upper and lower bearings 22 and 24. By this construction, the cutter assembly 20 is adapted to rotate about an axis coinciding with the centerline of mandrel assembly 14, with the cutter assembly preferably configured for relatively high speed rotation, such as on the order of 1000–2000 revolutions per minute.

In order to effect rotary drive of cutter assembly 20, the cutter assembly includes a generally cylindrical cutter drive member 26 having one end which extends above frame 12 with a cutter drive pulley 28 affixed thereto. A cutter drive motor 30 is mounted on frame 12, with a motor drive pulley 32 affixed to the motor shaft acting through a cutter drive belt 34 to rotate cutter assembly 20 within mandrel assembly 14.

The rotary cutter assembly 20 further includes an elongated, generally cylindrical cutter arbor 36 which extends within cutter drive member 26, and extends within mandrel assembly 14 from the free end of forming mandrel 18 to above frame 12 of the apparatus. The cutter arbor 36 is adapted for rotation together with cutter drive member 26, and is further adapted for axial movement with respect to the drive member 26 as they rotate together. To this end, a first flanged cam coupling 38 is keyed to cutter arbor 36 above cutter drive pulley 28. To effect rotation of cutter arbor 36 with cutter drive member 26, a drive pin 40 extends from drive member 26 and drive pulley 28 partially into a pin drive opening 41 defined by first flanged coupling 38. By this construction, the cutter arbor 36, which is illustrated in FIG. 1 in its upwardly-most position with respect to mandrel assembly 14, is adapted to move axially downwardly of drive member 26 and mandrel assembly 14. Bushings 42 and 44 disposed between drive member 26 and cutter arbor 36 facilitate relative axial movement between the drive member and cutter arbor as they rotate together.

The rotary cutter assembly 20 further includes an elongated blade actuating rod 46 which is disposed within cutter arbor 36 and extends substantially the length thereof. The blade actuating rod 46 is also adapted for rotation with cutter arbor 36 and drive member 26, and to this end, a rod drive coupling 48 is affixed to actuating rod 46 near the upper end thereof with a pin 50 or like fastening means. In order to couple cutter arbor 36 with blade actuating rod 46 in driving relation, the rod drive coupling 48 includes a key portion 52 which is received within a key slot portion 54 of cutter arbor 36. This configuration results in cutter arbor 36 positively acting to rotatably drive blade actuating rod 46 therewith, with this configuration further permitting relative axial movement between the blade actuating rod 46 and the cutter arbor 36 as they rotate together (actuating rod 46 is illustrated in its upwardly-most position in FIG. 1). Thus, the clearance provided between rod drive coupling 48 and the upper end of cutter arbor 36 must be sufficient to accommodate relative axial movement of the actuating rod 46 and the cutter arbor.

To effect the desired axial movement of blade actuating rod 46, a second flanged cam coupling 56 is connected to blade actuating rod 46. A bushing 58 is interposed generally between the upper end of cutter arbor 36 and the second flanged coupling 56 to accommodate axial movement of the coupling 56 with respect to the cutter arbor. An end nut 60 threadingly engages the second flanged coupling 56, and affixes the coupling 56 to the rod drive coupling 48 for rotation of the flanged 56 coupling together with blade actuating rod 46.

Thus, by the above-described construction, cutter drive member 26 rotatably drives cutter arbor 36, which in turn rotatably drives blade actuating rod 40. During rotation together, the cutter arbor 36 is relatively axially movable within cutter drive member 26, with blade actuating rod 46 being likewise relatively axially movable within the cutter arbor 36.

The present invention contemplates that attendant to reciprocable relative axial movement of cutter arbor 36 and blade actuating rod 46, one or more cutting blades of the rotary cutter assembly 20 are moved inwardly and outwardly of forming mandrel 18 at its free end. In this embodiment of the present invention, this cutting action is provided by one or more flexible cutting blades 66 (two being illustrated). Each blade 66 has one end operatively connected with the blade actuating rod 46, such as by disposition of the ends of blades 66 in a split portion of the rod 46, with the blades secured such as by pin 68. The blades 66 extend generally outwardly in opposite directions from the blade actuating rod 46, with the inward and outward movement of the blades 66 with respect to forming mandrel 18 preferably guided by a pair of the guide rollers 70 mounted on cutter arbor 36 in respective operative engagement with blades 66. The movement of blades 66 is further preferably guided by a guide disc 72 carried by cutter arbor 36 having suitably shaped arcuate guiding surfaces so that the cutting end portions of blades 66 move inwardly and outwardly of forming mandrel 18 attendant to relative axial movement of cutter arbor 36 and blade actuating rod 46. If desired, a further pair of guide rollers can be provided on the guide disc 72 for respectively guidingly engaging the blades 66 generally along the downwardly facing surfaces of the cutting portions of the blades.

As noted above, very high speed formation of tubular segments S from tube of material T is facilitated by movement of cutter blades 66 in the direction A of tube advancement during internal cutting of the tube T. Thus, the present apparatus includes a cam mechanism which operates to not only relatively axially move actuating rod 46 and cutter arbor 36 for reciprocably moving blades 66 inwardly and outwardly of forming arbor 18, but which also operates to move the blades 66 in the direction A of tube advancement during cutting.

Figure 2:
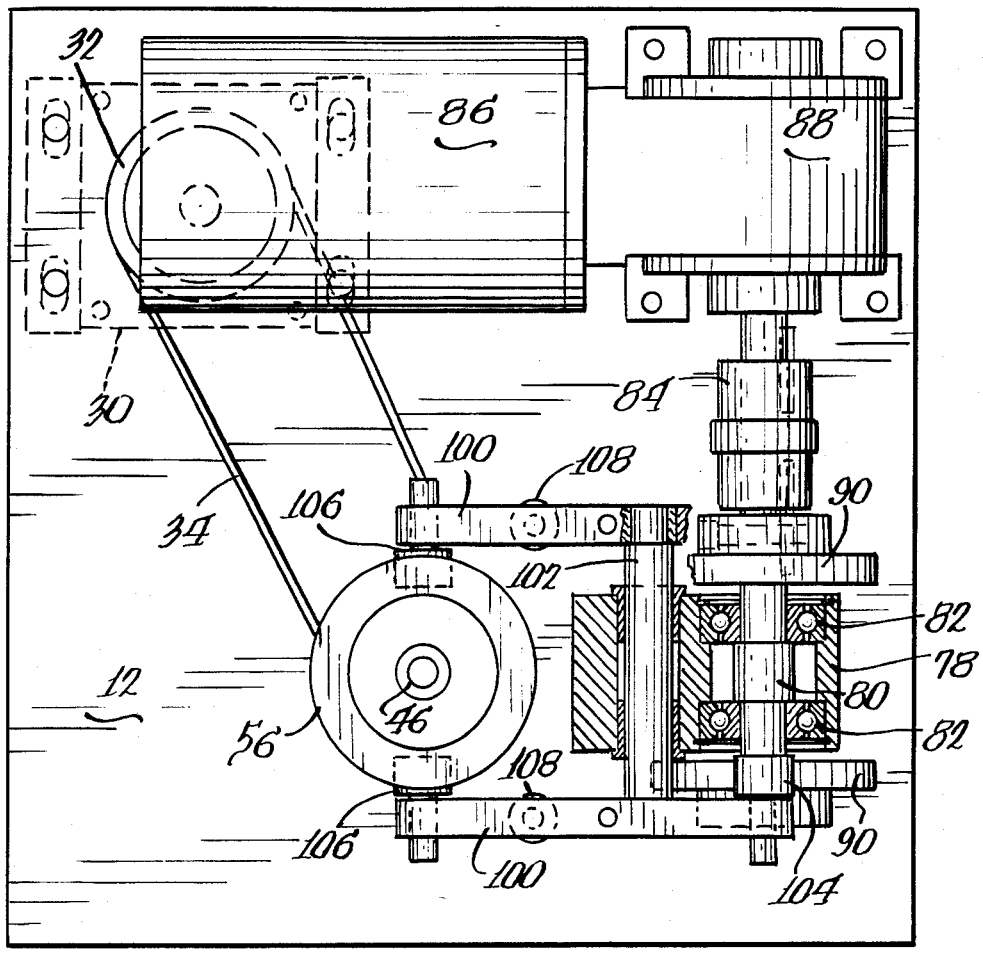
FIG. 2 is a top plan view in partial cross-section and cutaway of the apparatus illustrated in FIG. 1 taken generally along lines 2—2 in FIG. 1.

The cam mechanism of the present apparatus includes a cam support 78 mounted on frame 12, and which rotatably supports a cam shaft 80 by means of bearings 82 (FIG. 2). The cam shaft 80 is driven via a drive coupling 84, with power to the coupling 84 provided by a cam drive motor 86 operating via a cam drive gearbox 88, both of which are mounted on frame 12.

Axial movement of cutter arbor 36 and blade actuating rod 46 is adapted to be effected via first and second flanged cam couplings 38 and 56, and to this end the cam mechanism includes a pair of cams 90 each having the same cam profile, both of the cams 90 being mounted on cam shaft 80 on respective opposite sides of cam support 78. The cams 90 effect axial movement of cutter arbor 36 via a pair of first cam follower links or rockers 92 affixed to respective opposite ends of a link rocker shaft 94 rotatably supported on cam support 78 so that links 92 are pivotally movable together. Each of follower links 92 has mounted thereon at one end a cam roller follower 96 for operative engagement with a respective one of cams 90, with each link 92 acting through first flanged cam coupling 38 (affixed to cutter arbor 36) by a respective coupling roller 98 disposed between the flanges of coupling 38. While it will be recognized that the desired axial movement of cutter arbor 36 could be likewise effected through a single cam follower link 92, the provision of a pair of links 92 operating on opposite sides of flanged coupling 38 obviates problems of cocking or the like of the coupling 38 which could otherwise interfere with the desired high speed operation of the present apparatus.

The desired axial movement of blade actuating rod 46 is similarly effected. The cam mechanism of the apparatus further includes a pair of second cam follower links or rockers 100 which are also fixed to respective opposite ends of a rocker shaft 102 rotatably supported in cam support 78 for pivotal movement of the follower links 100 together. Each follower link 100 has mounted thereon at one end a cam roller follower 104 for operative engagement with a respective one of cams 90, with the other end of each follower link 100 having a coupling roller 106 operatively disposed between the flanges of second flange cam coupling 56 connected with blade actuating rod 46. A pair of cam springs 108 held in captive relation between each respective pair of links 100 and 92 assures positive operative engagement of the follower links with the cams 90.

Notably, the desired mode of cutting operation by axial movement of blade actuating rod 46 and cutter arbor 36 can be commonly effected by cams 90 operating through both first and second cam follower links 92 and 100. As will be recognized, this permits the present apparatus to be quite compact and readily fabricated at minimum expense. As will be further recognized, however, other cam arrangements can be readily employed for effecting the desired axial movement of cam actuating rod 46 and cutter arbor 36. Further, the arrangement can be fabricated other than as illustrated depending upon the exact cutting action desired. The cam profiles, the relative positions of first and second follower links 92 and 100, the length and fulcrum points of the follower links, and other design parameters can be very widely varied to effect operation as follows.

As illustrated in FIG. 2, blade actuating rod 46 and cutter arbor 36 are positioned in their upwardly-most dispositions. Spiral winding of tube of material T on forming mandrel 18 is initiated such that the formed tube of material advances in direction A along forming mandrel 18 toward its free end. In the positions of blade actuating rod 46 and cutter arbor 36 illustrated in FIG. 1, flexible cutting blades 66 are in their retracted position with respect to forming mandrel 18 so that the formed tube of material T can pass by the blades and off of the free end of mandrel 18.

Cutter drive motor 30 is then started so as to rotate cutter assembly 20 within mandrel assembly 14. Cam drive motor 86 is next started to initiate cutting, with selected variation in the speed of cam drive motor 86 and the speed of formation of tube T by spiral winding permitting tubular segments S of various selected dimensions to be formed.

In each cycle of cutting, cams 90 operate through the cam follower links 100 to first relatively axially move blade actuating rod 46 with respect to cutter arbor 36 so that the cutting portions of flexible blades 66 are moved outwardly of and extend beyond the outer surface of forming mandrel 18, as illustrated in FIG. 1A. The cams 90 thereafter act through the cam follower links 92 and 100 to axially move blade actuating rod 46 and cutter arbor 36 together with respect to mandrel assembly 14. By this action, the cutting portions of flexible blades 66 are moved in the direction A of advancement of tube of material T as the blades internally cut the tube to form tubular segment S. As noted, this is a very important feature of the present invention since it permits very high speed formation of tubular segments S while providing each segment S with a generally cylindrical configuration. Presuming that the speed with which tube of material T is being advanced toward the free end of forming mandrel 18 is constant, it will be recognized that the speed of axial movement of blades 66 in the direction of tube advancement must be the same as the speed of tube advancement to form tubular segments which are actually truly cylindrical. In practice, however, the speed of axial blade movement can be somewhat greater or somewhat less than the speed of tube advancement while still permitting formation of tubular segments S which are sufficiently cylindrical in configuration to be acceptable. An excessive difference between the speed of tube advancement and the speed of axial blade movement results in the formation of spiral rather than circular cuts in the tube T.

After one of the segments S has been cut from the tube of material T, the axial movement of blade actuating rod 46 and cutter arbor 36 is reversed to complete the cutting cycle. The actuating rod 46 is first axially moved relative to the cutter arbor so that the cutting portions of blades 66 are retracted inwardly of the outer surface of forming mandrel 18, and the actuating rod 46 and the cutter arbor 36 are thereafter axially moved together upwardly within mandrel assembly 14 in the direction opposite of the direction of tube advancement. Retraction of the cutting portions of blades 66 before upward movement of the blades prevents interference with the tube of material T as it is advanced along and past the free end of forming mandrel 18.

The above steps are cyclically repeated for essentially continuous formation of tubular segments S as tube T is spirally wound on forming mandrel 18. Each internal cut of tube T is effected very quickly due to the preferred relatively high speed rotation of cutter assembly 20 within mandrel assembly 14 with the apparatus being readily capable of operating to form hundreds of tubular segments from tube T per minute (the number of segments formed per minute being related to the desired diameter, since a smaller diameter tube T can be more quickly spirally wound). Thus, the highly efficient manner in which each spirally wound tube segment is formed will be readily appreciated.

Because the formation of relatively large diameter tubular segments requires that a relatively larger cut be effected by blades 66, the use of two blades 66 is preferred for formation of such segments. Additionally, cutter assembly 20 is preferably rotated in the direction of spiral winding of tube T. Thus, if tube T is being fomed by attendant to rotation about forming mandrel 18 in a counter-clockwise direction (when viewed from the free end of the mandrel), spiral winding of the tube is effected clockwise, and thus cutting of the tube is preferably likewise effected in a clockwise direction, although the cutting of the tube can be effected in a direction opposite to the direction of spiral tube formation.

FIG. 4 illustrates a modified cutter assembly for the present apparatus. In this modified embodiment, a modified cutter arbor 136 rotates within forming mandrel 18 and is adapted for relative axial movement therein in the manner described above. This embodiment further includes a modified blade actuating rod 146 which extends within cutter arbor 136 for rotation therewith, and which is adapted for relative axial movement with respect thereto. The blade actuating rod 146 includes a blade cam portion 147 at its free end, with relative axial movement of the actuating rod 146 with respect to the cutter arbor 136 being adapted to provide inward and outward movement of a blade block 149 with respect to forming mandrel 18. Blade block 149 is carried by cutter arbor 136 such as by suitable slots or the like, with the blade block 149 carrying a cutting blade 151 adapted to move inwardly and outwardly of the outer surface of forming mandrel 18. A pair of blade cam rollers 153 are mounted on blade block 149, thus operatively connecting the blade block and the blade 151 with the blade actuating rod 146. It will be noted that this modified embodiment of the rotary cutter operates somewhat differently than the previously described cutter arrangement in that upward axial movement of actuating rod 146 with respect to cutter arbor 136 causes the cutting portion of blade 151 to move outwardly, and vice versa. Accordingly, the cam mechanism of the apparatus for axially moving the cutter arbor 136 and the blade actuating rod 146 can be suitably modified for effecting the axial movement of the actuating rod and the cutter arbor in the desired timed manner.

From the foregoing description of the present apparatus and method, the manner in which the present invention facilitates efficient formation of tubular segments from a tube of material will be readily appreciated. The present apparatus is quite compact, and can be easily fabricated and maintained at reasonable cost. By appropriately configuring the apparatus, and by appropriately selecting its operating speeds, the size of the tubular segments formed can be virtually infinitely varied, which is particularly significant when this invention is used for formation of heat-shrinkable tamper bands since such bands must be sized for containers of many different dimensions. Naturally, the present invention is readily adaptable for formation of tubular segments from a wide variety of materials, including non-heat shrinkable materials such as paper, preferably with the tube of material to be cut into segments being formed by spiral winding on the forming mandrel of the apparatus.

From the foregoing, it will be observed that numerous modifications and variations can be effected without departing from the true spirit and scope of the novel concept of the present invention. It will be understood that no limitations with respect to the specific apparatus illustrated herein is intended or should be inferred. It is, of course, intended to cover by the appended claims all such modifications as fall within the scope of the claims.

What is claimed is:

1. An apparatus for cutting a tube of spirally wound material into segments, comprising:
   mandrel means upon which said tube of material is spirally wound so that said tube is relatively axially advanced along said mandrel means;
   cutter means mounted within said mandrel means including blade means adapted for movement inwardly and outwardly of said mandrel means;
   means for cyclically operating said cutter means so that said blade means internally cuts said tube of material into said segments,
   said cutter means comprising cutter arbor means rotatably mounted in said mandrel means, blade actuating means disposed within said cutter arbor means and adapted for rotation therewith, and blade means operatively connected with said blade actuating means,
   said blade means including a cutting portion adapted for reciprocable movement inwardly and outwardly of said mandrel means attendant to relative axial movement of said blade actuating means and said cutter arbor means,
   means for rotating said cutter arbor means and said blade actuating means comprising cutter drive means rotatably mounted in said mandrel means, said cutter drive means supporting said cutter arbor means for rotation within said mandrel means, said rotating means further comprising motor means for rotating said cutter drive means,
   said cutter arbor means being mounted for reciprocable axial movement relative to said cutter drive means,
   said operating means including cam means for first relatively axially moving said blade actuating means and said cutter arbor means for moving the cutting portion of said blade means outwardly of said mandrel means, said cam means thereafter moving said blade actuating means and said cutter arbor means axially relative to said mandrel means in the direction of tube advancement so that the cutting portion of said blade means moves axially with respect to said mandrel means in the direction of tube advancement during cutting of said tube of material,
   said blade means comprising at least one flexible blade having one end connected to said blade actuating means, the other end of which provides said cutting portion,
   said cutter arbor means including means for guiding said flexible blade so that relative axial movement of said blade actuating means and said cutter arbor means is adapted to move said cutting portion inwardly and outwardly of said mandrel means.

2. An apparatus for cutting a tube of material into segments, comprising:
   mandrel means upon which said tube of material is carried and along which said tube is adapted to be relatively advanced;
   cutter means rotatably mounted in said mandrel means;
   means for rotating said cutter means within said mandrel means;
   said cutter means including blade means adapted to reciprocably move outwardly and inwardly of said mandrel means at a free end thereof, whereby when said blade means moves outwardly of said mandrel means said tube of material is internally cut by said blade means, and
   means for moving said blade means axially of said mandrel means in the direction of advancement of said tube during cutting of said tube of material by said blade means, said means moving said blade means axially being operable independently of the advancement of said tube of material.

3. An apparatus for cutting in accordance with claim 2, including
   means for reciprocably moving said blade means comprising cam means.

4. An apparatus for cutting in accordance with claim 1, wherein
   said means for moving said blade means axially comprises cam means.

5. An apparatus for cutting in accordance with claim 2, wherein
   said cutter means comprises cutter arbor means rotatably mounted within said mandrel means, and blade actuating means extending within said cutter arbor means for rotation therewith, said blade means being operatively connected to said blade actuating means whereby relative reciprocable axial movement of said blade actuating means and said cutter arbor means moves said blade means inwardly and outwardly of said mandrel means.

6. An apparatus for cutting in accordance with claim 5, including
   cam means for reciprocably relatively axially moving said cutter arbor means and said blade actuating means for reciprocably moving said blade means inwardly and outwardly of said mandrel means.

7. An apparatus for cutting in accordance with claim 5, wherein
   said means for moving said blade means axially comprises cam means, said cam means relatively axially moving said cutter arbor means and said blade actuating means for reciprocably moving said blade means inwardly and outwardly of said mandrel means.

8. An apparatus for cutting in accordance with claim 7, wherein
   said cam means operates to relatively move said blade actuating means axially with respect to said cutter arbor means to move said blade means outwardly of said mandrel means, said cam means further operating to move both said cutter arbor means and said blade actuating means axially of said mandrel means in the direction of advancement of said tube so that said blade means move axially of said mandrel means during cutting of said tube of material.

9. An apparatus for cutting a tube of material into segments, comprising:

mandrel means upon which said tube of material is carried and along which said tube is adapted to be relatively advanced;

cutter means rotatably mounted in said mandrel means;

means for rotating said cutter means within said mandrel means;

said cutter means including blade means adapted to reciprocably move outwardly and inwardly of said mandrel means at a free end thereof, whereby when said blade means moves outwardly of said mandrel means said tube of material is internally cut by said blade means, said cutter means comprising cutter arbor means rotatably mounted within said mandrel means, and blade actuating means extending within said cutter arbor means for rotation therewith, said blade means being operatively connected to said blade actuating means whereby relative reciprocable axial movement of said blade actuating means and said cutter arbor means moves said blade means inwardly and outwardly of said mandrel means, said blade means comprising at least one flexible blade having one end affixed to said blade actuating means, and having an opposite cutting end movable inwardly and outwardly of said mandrel means, said cutter arbor means including blade guide means for guiding said flexible blade so that said cutting end of said flexible blade moves inwardly and outwardly of said mandrel means attendant to relative axial movement of said blade actuating means and said cutter arbor means.

10. An apparatus for cutting a tube of material into segments, comprising:

mandrel means upon which said tube of material is carried and along which said tube is adapted to be relatively advanced;

cutter means rotatably mounted in said mandrel means;

means for rotating said cutter means within said mandrel means;

said cutter means including blade means adapted to reciprocably move outwardly and inwardly of said mandrel means at a free end thereof, whereby when said blade means moves outwardly of said mandrel means said tube of material is internally cut by said blade means, said cutter means comprising cutter arbor means rotatably mounted within said mandrel means, and blade actuating means extending within said cutter arbor means for rotation therewith, said blade means being operatively connected to said blade actuating means whereby relative reciprocable axial movement of said blade actuating means and said cutter arbor means moves said blade means inwardly and outwardly of said mandrel means, said blade means comprising a blade mounted on a blade block carried by said cutter arbor means, said cutter means including blade cam means operatively connecting said blade block with said blade actuating means so that said blade moves inwardly and outwardly of said mandrel means attendant to relative axial movement of said blade rod means and said cutter arbor means.

11. An apparatus for cutting a tube of spirally wound material into segments, comprising:

mandrel means upon which said tube of material is spirally wound so that said tube is relatively axially advanced along said mandrel means;

cutter means mounted within said mandrel means including blade means adapted for movement inwardly and outwardly of said mandrel means;

means for cyclically operating said cutter means so that said blade means internally cuts said tube of material into said segments, said operating means including means for moving said blade means axially of said mandrel means in the direction of advancement of said tube during cutting of said tube of material, said means for moving said blade means axially being operable independently of the advancement of said tube of material.

12. An apparatus for cutting in accordance with claim 11, wherein said cutter means comprises cutter arbor means rotatably mounted in said mandrel means, blade actuating means disposed within said cutter arbor means and adapted for rotation therewith, said blade means being operatively connected with said blade actuating means, said blade means including a cutting portion adapted for reciprocable movement inwardly and outwardly of said mandrel means attendant to relative axial movement of said blade actuating means and said cutter arbor means.

13. An apparatus for cutting in accordance with claim 12, including means for rotating said cutter arbor means and said blade actuating means comprising cutter drive means rotatably mounted in said mandrel means, said cutter drive means supporting said cutter arbor means for rotation within said mandrel means, said rotating means further comprising motor means for rotating said cutter drive means.

14. An apparatus for cutting in accordance with claim 13, wherein said cutter arbor means is mounted for reciprocable axial movement relative to said cutter drive means, said means for moving said blade means axially comprising cam means for first relatively axially moving said blade actuating means and said cutter arbor means for moving the cutting portion of said blade means outwardly of said mandrel means, said cam means thereafter moving said blade actuating means and said cutter arbor means axially relative to said mandrel means in the direction of tube advancement so that the cutting portion of said blade means moves axially with respect to said mandrel means in the direction of tube advancement during cutting of said tube of material.

15. An apparatus for cutting a tube of spirally wound material into segments, comprising:

mandrel means upon which said tube of material is spirally wound so that said tube is relatively axially advanced along said mandrel means;

cutter means mounted within said mandrel means including blade means adapted for movement inwardly and outwardly of said mandrel means;

means for cyclically operating said cutter means so that said blade means internally cuts said tube of material into said segments, said cutter means comprising cutter arbor means rotatably mounted in said mandrel means, blade actuating means disposed within said cutter arbor means and adapted for rotation therewith, and blade means operatively connected with said blade actuating means, said blade means including a cutting portion adapted for reciprocable movement inwardly and outwardly of said mandrel means attendant to relative axial movement of said blade actuating means and said cutter arbor means, means for rotating said cutter arbor means and said blade actuating means comprising cutter drive means rotatably mounted in said mandrel means, said cutter drive means supporting said cutter arbor means for rotation within said mandrel means, said rotating means further comprising motor means for rotating said cutter drive means, said cutter arbor means being mounted for reciprocable axial movement relative to said cutter drive means, said operating means including cam means for first relatively axially moving said blade actuating means and said cutter arbor means for moving the cutting portion of said blade means outwardly of said mandrel means, said cam means thereafter moving said blade actuating means and said cutter arbor means axially relative to said mandrel means in the direction of tube advancement so that the cutting portion of said blade means moves axially with respect to said mandrel means in the direction of tube advancement during cutting of said tube of material, first cam coupling means operatively connected with said cutter arbor means for rotation therewith;

second cam coupling means operatively connected with said blade actuating means for rotation therewith; and cam link means operatively connecting said cam means with said first and second coupling means for reciprocably axially moving said cutter arbor means and said blade actuating means with respect to each other and with respect to said mandrel means.

16. An apparatus in accordance with claim 15, wherein said cam link means includes at least one first cam link operatively connecting said first coupling means and said cam means, and at least one second cam link operatively connecting said second coupling means and said cam means, said cam means comprising at least one cam which commonly operates both of said first and second cam links.

17. A method of cutting a tube of material into segments, comprising the steps of:

providing mandrel means upon which said tube of material is carried;

relatively advancing said tube of material along said mandrel means toward a free end of said mandrel means;

providing cutter means, including blade means, in said mandrel means;

operating said cutter means to reciprocably move said blade means inwardly and outwardly of the free end of said mandrel means to internally cut said tube of material into said segments, and axially moving said cutter means with respect to said mandrel means in the direction of advancement of said tube of material during cutting of said tube by said blade means, said axial movement step being effected independently of the advancement of said tube of material.

18. A method of cutting in accordance with claim 17, including rotating said cutter means within said mandrel means during cutting of said tube of material.

19. A method of cutting in accordance with claim 18, wherein said step of providing said cutter means comprises providing cutter arbor means rotatably mounted in said mandrel means, and providing blade actuating means disposed within said cutter arbor means for rotation therewith and operatively connecting said blade actuating means and said blade means, said step of reciprocably moving said blade means comprising relatively axially moving said blade actuating means and said cutter arbor means.

20. A method of cutting in accordance with claim 19, wherein said step of axially moving said cutter means comprises moving said cutter arbor means and said blade actuating means together axially of said mandrel means in said direction of tube advancement after said cutter arbor means and said blade actuating means have been relatively axially moved to move said blade means outwardly of said mandrel means.

* * * * *